(12) United States Patent
Chintalapati et al.

(10) Patent No.: US 7,600,030 B2
(45) Date of Patent: Oct. 6, 2009

(54) COMPOUNDING OF HTTP AUTHORING PROTOCOL

(75) Inventors: V. R. Kishore Chintalapati, Redmond, WA (US); Dave M. Kruse, Redmond, WA (US); Ahmed H. Mohamed, Redmond, WA (US); Andrew Sean Watson, Redmond, WA (US); Dustin G. Fresenhahn, Redmond, WA (US); Jay Paulus, Redmond, WA (US); Sundar Subbarayan, Redmond, WA (US); Sean McAteer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 11/217,626

(22) Filed: Aug. 31, 2005

(65) Prior Publication Data
US 2007/0050512 A1    Mar. 1, 2007

(51) Int. Cl.
  *G06F 15/16* (2006.01)
  *G06F 3/00* (2006.01)
(52) U.S. Cl. .................. 709/230; 709/203; 709/217; 709/227; 715/751
(58) Field of Classification Search .............. 709/203, 709/230, 238, 240; 715/229, 733, 734, 751, 715/760
See application file for complete search history.

(56) References Cited

U.S. PATENT DOCUMENTS

| | | |
|---|---|---|
| 5,491,822 A | 2/1996 | Allen et al. |
| 5,600,826 A | 2/1997 | Ando |
| 5,793,966 A | 8/1998 | Amstein et al. |
| 5,848,234 A | 12/1998 | Chernick et al. |
| 5,935,211 A | 8/1999 | Osterman |
| 5,956,483 A | 9/1999 | Grate et al. |
| 5,999,979 A | 12/1999 | Vellanki et al. |
| 6,012,087 A | 1/2000 | Freivald et al. |
| 6,067,558 A | 5/2000 | Wendt et al. |
| 6,128,653 A | 10/2000 | Del Val et al. |
| 6,208,427 B1 | 3/2001 | Lee |
| 6,208,640 B1 | 3/2001 | Spell et al. |
| 6,208,952 B1 | 3/2001 | Goertzel et al. |
| 6,243,396 B1 | 6/2001 | Somers |
| 6,253,217 B1 | 6/2001 | Dourish et al. |

(Continued)

FOREIGN PATENT DOCUMENTS

GB    2351573    3/2001

(Continued)

OTHER PUBLICATIONS

Leonid Braginski and Matthew Powell; Distributed Authoring and Versioning Extensions for HTTP Enable Team Authoring; retrieved Oct. 7, 2005 http://www.microsoft.com/msj/0699/dav/dav.aspx.

(Continued)

*Primary Examiner*—Yasin M Barqadle
*Assistant Examiner*—Tariq S Najee-Ullah
(74) *Attorney, Agent, or Firm*—Merchant & Gould P.C.

(57) ABSTRACT

Conventions for extending compounded web authoring methods to a web authoring protocol such as WebDAV. More particularly, a request can be provided with special header information to signify a method compounded with a method indicated by a verb in the request. Techniques for clients and servers to use the web authoring extensions. Extended error handling to allow servers to provider richer web authoring error information to clients.

10 Claims, 12 Drawing Sheets

U.S. PATENT DOCUMENTS

| | | | |
|---|---|---|---|
| 6,260,148 B1 | 7/2001 | Aggarwal | |
| 6,266,701 B1 | 7/2001 | Sridhar et al. | |
| 6,269,380 B1 | 7/2001 | Terry et al. | |
| 6,332,127 B1 | 12/2001 | Bandera et al. | |
| 6,351,748 B1 | 2/2002 | Deen et al. | |
| 6,356,907 B1 | 3/2002 | Hopmann | |
| 6,356,920 B1 | 3/2002 | Vandersluis | |
| 6,401,097 B1 | 6/2002 | McCotter et al. | |
| 6,408,298 B1 | 6/2002 | Van et al. | |
| 6,408,336 B1 | 6/2002 | Schneider et al. | |
| 6,415,327 B1 | 7/2002 | Beckerman et al. | |
| 6,449,633 B1 | 9/2002 | Van et al. | |
| 6,526,435 B1 * | 2/2003 | Lippert | 709/203 |
| 6,557,040 B1 | 4/2003 | Friedman et al. | |
| 6,581,099 B1 | 6/2003 | Deen et al. | |
| 6,615,231 B1 | 9/2003 | Deen | |
| 6,629,127 B1 | 9/2003 | Deen et al. | |
| 6,658,476 B1 | 9/2003 | Deen | |
| 6,654,794 B1 * | 11/2003 | French | 709/217 |
| 6,675,353 B1 * | 1/2004 | Friedman | 715/239 |
| 6,691,119 B1 | 2/2004 | Lippert | |
| 6,694,335 B1 | 2/2004 | Hopmann | |
| 6,748,470 B2 | 6/2004 | Goldick et al. | |
| 6,760,886 B1 | 7/2004 | Nadon | |
| 6,839,735 B2 | 1/2005 | Wong | |
| 6,842,770 B1 | 1/2005 | Serlet et al. | |
| 6,944,642 B1 | 9/2005 | Hopmann | |
| 6,947,991 B1 | 9/2005 | Burton et al. | |
| 6,985,936 B2 | 1/2006 | Agarwalla | |
| 2002/0091738 A1 * | 7/2002 | Rohrabaugh et al. | 707/517 |
| 2003/0046366 A1 | 3/2003 | Pardikar | |
| 2003/0050964 A1 | 3/2003 | Debaty | |
| 2003/0074392 A1 | 4/2003 | Campbell | |
| 2004/0122897 A1 | 6/2004 | Seelemann, II et al. | |
| 2004/0163037 A1 * | 8/2004 | Friedman et al. | 715/501.1 |
| 2004/0163086 A1 | 8/2004 | Friedman et al. | |
| 2004/0167983 A1 | 8/2004 | Friedman et al. | |
| 2004/0193940 A1 * | 9/2004 | Snyder et al. | 714/4 |
| 2004/0215747 A1 | 10/2004 | Maron | |
| 2005/0033776 A1 | 2/2005 | Kircher | |
| 2005/0055333 A1 | 3/2005 | Deen et al. | |
| 2006/0126809 A1 | 6/2006 | Halpern | |
| 2006/0150036 A1 | 7/2006 | Pierce | |

OTHER PUBLICATIONS

E. James Whitehead, Jr.; Lessons from WebDAV for the Next Generation Web Infrastructure; Abstract; retrieved Oct. 7, 2005 http://www.ics.uci.edu/~ejw/http-future/whitehead/http_pos_paper.html.

Apache based WebDAV Server with LDAP and SSL; 5.1. Restricting access to DAV shares; retrieved Oct. 7, 2005 http://www.tldp.org.HOWTO/Apache-WebDAV-LDAP-HOWTO/x383.html.

Y. Goldand; HTTP Extensions for Distributed Authoring—WebDAV; Introduction; Feb. 1999; retrieved Oct. 7, 2005 http://asg.web.cmu.edu/rfc/rfc2518.html.

Dridi, Fredj; Neumann, Gustaf. "How to implement Web-based Groupware Systems based on WebDAV," Infrastructure for Collaborative Enterprises, Stanford, CA; Jun. 1999; [7 pages].

Whitehead, Jr., E. James. "World Wide Web Distributed Authoring and Versioning (WebDAV): An Introduction," vol. 5, No. 1; Mar. 1997; pp. 3-8.

Hunt, James J.; Reuter, Jurgen. "Using the Web for document versioning: an implementation report for DeltaV," Proceedings of the 23rd International Conference; May 12-19, 2001; pp. 507-513.

Braginski, Leonid; Powell, Matthew. "Distributed Authoring and Versioning Extensions for HTTP Enable Team Authoring," Jun. 1999, [20 pages].

Carlson, R., et al., "Guidelines for Next Hop client (NHC) Developers," RFC 2583, May 1999 (9 pp.).

Fielding, R., et al., "Hypertext Transfer Protocol—HTTP/1.1," RFC 2068, Jan. 1997 (145 pp.).

Freed, N., "SMTP Service Extension for Returning Enhanced Error Codes," RFC 2034, Oct. 1996 (6 pp.).

Goland, Y., et al., "HTTP Extensions for Distributed Authoring—WebDAV," RFC 2518, Feb. 1999 (83 pp.).

Shepler, S., et al., "Network File System (NFS) Version 4 Protocol," RFC 3530, Apr. 2003 (275 pp).

Slein, J., et al., "Requirements for a Distributed Authoring and Versioning Protocol for the World Wide Web," RFC 2291, Feb. 1998 (19 pp).

Vaudreuil, G., "Enhanced Mail System Status Code," RFC 1893, Jan. 1996 (15 pp).

IBM Personal Computer Seminar Proceedings, "The IBM PC Network Program," vol. 2, No. 5, Sep. 1984 (13 pp).

IBM Virtual Telecommunication Access Method "VTAM" (No Document).

O'Shields et al., "WebDAV: A Web-Writing Protocol and More," Feb. 2004—Apr. 2004, vol. 20, No. 2, 10 pages, accessed at: http://nait.org/jit/Articles/oshields012004.pdf.

Shadgar et al., "Adapting Databases and WebDAV Protocol," May 2004, 11 pages, accessed at: http://www.www2004.org/proceedings/docs/1p612.pdf.

Whitehead, Jr., et al., "The WebDAV Property Design," 2004, 23 pages, accessed at: http://www.goland.org/spe-whitehead.pdf.

* cited by examiner example POST+UNLOCK request:

228
```
POST http://www.example.com/name_of_file.htm
...
Content-Type: application/x-www-form-urlencoded; charset=utf-8; ...
Lock-Token: opaquelocktoken:{3932E32A-8825-494E-A19E-
E714A7A741A8}20041130T183232Z
X-MSDAVEXTLockTimeout: second-0
...
<content>
```

222 → Lock-Token line
224 → X-MSDAVEXTLockTimeout line

| HTTP verb (220) | headers | | result (226) |
|---|---|---|---|
| | Lock-Token: (222) | X-MSDAVEXT LockTimeout: (224) | |
| GET\|POST | Y | N | FAIL |
| GET\|POST | Y | Y | FAIL - if token doesn't match<br>LOCK - if no existing lock at server<br>REFRESH - if X-MSDAVEXTLockTimeout ≠ 0<br>UNLOCK - if X-MSDAVEXTLockTimeout = 0 |
| GET\|POST | N | Y | sent lock token:<br>FAIL - if file is already locked<br>FAIL - if file is locked & X-...Lock-Timeout=0<br><br>didn't send lock token:<br>LOCK - if no existing lock at server |
| GET\|POST | N | N | return file |
| PUT | Y | N | success - if token matched<br>FAIL - if token mismatch or file not locked |
| PUT | Y | Y | FAIL - if token doesn't match<br>LOCK - if no existing lock at server<br>REFRESH - if X-MSDAVEXTLock-Timeout ≠ 0<br>UNLOCK - if X-MSDAVEXTLock-Timeout = 0 |
| PUT | N | Y | sent lock token:<br>FAIL - if file is already locked<br>FAIL - if file is locked & X-...Lock-Timeout=0<br><br>didn't send lock token:<br>LOCK - if no existing lock at server |
| PUT | N | N | return file |

144 = GET\|POST rows; 146 = PUT rows example PUT+REFRESH request:

230
```
PUT http://www.example.com/somefile/name_of_file.htm
...
Content-Type: application/x-www-form-urlencoded; charset=utf-8; ...
X-MSDAVEXTLockTimeout: second-120
Lock-Token: opaquelocktoken:{3932E32A-8825-494E-A19E-
E714A7A741A8}20041130T183232Z
...
<content>
```

| HTTP verb | header | | result |
|---|---|---|---|
| | Content-type: | X-MSDAVEXT: | (effective method) |
| GET | multipart/MSDAVEXTPrefixEncoded | PROPFIND | GET+PROPFIND |
| POST | multipart/MSDAVEXTPrefixEncoded | PROPFIND | POST+PROPFIND |
| PUT | multipart/MSDAVEXTPrefixEncoded | PROPPATCH | PUT+PROPPATCH |
| PUT | multipart/MSDAVEXTPrefixEncoded | PROPFIND | PUT+PROPFIND |

240   242

246 example GET+PROPFIND request:

POST /shared%20documents//Copy%20of%20Folder/test.rtf HTTP/1.1 translate: f
User-Agent: Microsoft-WebDAV-MiniRedir/5.2.3790
Host: office
Connection: Keep-Alive
Pragma: no-cache
242 — X-MSDAVEXT: PROPFIND
Content-type: ...
...

250 example GET+PROPFIND response:

HTTP/1.1 200 OK

Date: Tue, 25 Jan 2005 03:12:31 GMT
Server: Microsoft-IIS/6.0
MicrosoftSharePointTeamServices: 6.0.2.6361
X-Powered-By: ASP.NET
Last-Modified: Thu, 12 Feb 2004 02:33:01 GMT
ETag: "{3E94207C-8E12-4491-B0FF-A903E2C9610E},7"
ResourceTag: rt:3E94207C-8E12-4491-B0FF-A903E2C9610E@00000000007
240 — Content-type: multipart/MSDAVEXTPrefixEncoded ; ...
Cache-Control: private
X-MSDAVEXTLockTimeout: Second-####   ◀── (some number of seconds)
Lock-Token: opaquelocktoken:{4A7A741A8}20041130T183232Z
Content-Length: #####   ◀── (size of body 248)
Public-Extension: http://schemas.microsoft.com/repl-2

248 — <length of properties section>
<properties>
<length of resource>
<resource>

FIG. 9

270 example PUT+PROPPATCH+UNLOCK request:

PUT /shared%20documents/Copy%20of%20Folder/test.rtf HTTP/1.1

...
translate: f
User-Agent: Microsoft-WebDAV-MiniRedir/5.2.3790
Host: dustinfrserver
Content-Length: 114234
Connection: Keep-Alive
X-MSDAVEXT: PROPPATCH
X-MSDAVEXTLockTimeout: Second-0
Lock-Token: opaquelocktoken:{4A7A741A8}20041130T183232Z
Content-type: multipart/MSDAVEXTPrefixEncoded
Pragma: no-cache
Authorization: NTLM
...

<length of properties section><some pushed properties>
<length of resource><some PUT resource subject to the pushed properties>

272 example PUT+PROPPATCH+UNLOCK response:

HTTP/1.1 200 OK

HTTP/1.1 200 OK
Date: Tue, 30 Nov 2004 18:32:34 GMT
Server: Microsoft-IIS/6.0
X-Powered-By: ASP.NET
MicrosoftSharePointTeamServices: 6.0.2.5530
Cache-Control: private
Content-Length: 0
Public-Extension: http://schemas.microsoft.com/repl-2

FIG. 10

290    example POST+PROPFIND+LOCK request:

```
POST /shared%20documents/Copy%20of%20Folder/test.rtf HTTP/1.1 translate: f
User-Agent: Microsoft-WebDAV-MiniRedir/5.2.3790
Host: dustinfrserver
Connection: Keep-Alive
X-MSDAVEXT: PROPFIND
X-MSDAVEXTLockTimeout: Second-60
Content-Length: 0
Pragma: no-cache
Authorization: NTLM
...
```

292    example POST+PROPFIND+LOCK response:

```
HTTP/1.1 200 OK

Date: Tue, 30 Nov 2004 18:32:34 GMT
Server: Microsoft-IIS/6.0
X-Powered-By: ASP.NET
MicrosoftSharePointTeamServices: 6.0.2.5530
Cache-Control: private
Content-Length: 1056
Content-type: multipart/MSDAVEXTPrefixEncoded ; ...
X-MSDAVEXTLockTimeout: Second-60
Lock-Token: opaquelocktoken:{4A7A741A8}20041130T183232Z
Public-Extension: http://schemas.microsoft.com/repl-2
...

00000000000001F4
<500 bytes of some returned properties>
000000000000020C
<524 bytes of some posted resource>
```

| Extended Error code (Decimal) | an error code which the client can map to a system-level error code |
|---|---|
| String (URL Encoded) | a string with extended information for clients to use |

302

```
HTTP/1.1 401 Unauthorized
Content-Length: 1656
Content-Type: text/html
X-MSDAVEXT_ERROR: 2342; The file is checked out to "Redmond\
dustinfr"
Server: Microsoft-IIS/6.0
WWW-Authenticate: NTLM
X-Powered-By: ASP.NET
MicrosoftSharePointTeamServices: 12.0.0.000
Date: Tue, 25 Jan 2005 03:11:51 GMT
...
```

FIG. 12

COMPOUNDING OF HTTP AUTHORING PROTOCOL

BACKGROUND

FIG. 1 shows an HTTP message 50. The exchange of HTTP messages 50 between an HTTP client 52 and an HTTP server 54 is well known in the art of client-server computing. Various RFCs and other public documents may be consulted for details about the various versions and variations of HTTP. For instance, RFC 2616 defines HTTP version 1.1. According to RFC 2616, an HTTP message 50 that is for an HTTP request has a request line 54, such as "GET/HTTP/1.1". An HTTP message 50 that is for an HTTP response instead has a status line 56, such as "HTTP/1.1 200 OK". A request line 54 or status line 56 is usually followed by one or more headers, each consisting of a field name 60 and, depending on the particular header, zero or more field bodies 62. A message 50 may end with a message body 64, depending on the type of request or response. Details relating to delimiters, particular headers, and other features of HTTP messages and HTTP communication can be found elsewhere.

FIG. 2 shows an example HTTP request 80 and an example HTTP response 82. The HTTP client 52 sends request 80 over a data network 84 to the HTTP server 54, which handles the request and returns the response 82. The request 80 includes a request line 87 and a number of headers 88 (some requests also have a message body). The response 82 includes a status line 89, headers 90, and a message body 92. HTTP communications need not travel over a network such as network 84; communication between a local client and a local server is possible, albeit usually through the local system's communications stacks.

A shortcoming with HTTP is that it does not provide for authoring through an HTTP channel. That is, the standard HTTP specifications do not specifically provide for clients to manage resources on servers. There is no way for a client to perform resource management operations like copying resources (e.g., files, documents, etc.), moving resources on a server, setting or obtaining properties of resources on a server, locking resources, and so on. In response to this shortcoming, various public and private extensions to HTTP have been devised.

FIG. 3 shows some method extensions 100 and header extensions 102 of a protocol or extension of HTTP that adds remote authoring functionality on top of HTTP. These extensions are from RFC 2518, which defines "HTTP Extensions for Web Authoring and Versioning", or "WebDAV". WebDAV is a superset of HTTP that is sometimes referred to as a protocol, and sometimes referred to as an extension of HTTP. The WebDAV protocol defines conventions, methods 100, and headers 102, for requests and responses that otherwise comply with HTTP. That is, WebDAV requests and responses follow the basic format of HTTP messages (e.g., message 50 in FIG. 1). Technically, some of the verbs in the web authoring methods 100 are defined as valid HTTP verbs, however, their functionality is extended by WebDAV. For example, PUT is part of HTTP, but WebDAV extends its functionality to collections, directories, folders, etc. The same basic HTTP communication rules are used, the same line/field/body delimiters are used, the same error codes may be used, and base HTTP methods 104 and base HTTP headers can appear in WebDAV messages. For example an ordinary HTTP OPTIONS request may be answered by a WebDAV-compliant server with a response that has standard HTTP headers as well as one or more non-standard HTTP headers that indicate the availability of one or more HTTP extensions on the server. In general, this manner of extending HTTP allows servers and clients to handle both base HTTP communications as well as various extensions thereto, even if a remote system does not support an extension that is supported locally; unsupported headers and methods are usually ignored or handled gracefully.

The WebDAV extension to HTTP provides functionality to create, change and move documents on a remote server (typically a web server). WebDAV implementations are useful, among other things, for remotely authoring documents or resources served by a web server. WebDAV implementations can also be used for general access-anywhere web-based file storage. Many operating systems, such as Windows, Linux, and Mac OSX provide built-in client and server support for WebDAV, thus allowing transparent use of files on a WebDAV server somewhat as if they were stored in a local directory.

The methods and headers of WebDAV are fully documented elsewhere, however, the main methods are: PUT—put a resource or collection on the server; DELETE—delete a resource or collection from the server; PROPFIND—retrieve properties (as XML) of a resource; PROPPATCH—change and delete properties of a resource; MKCOL—create collections or directories; COPY—copy a resource from one URI to another on the server; MOVE—move a resource from one URI to another on the server; LOCK—put a lock on a resource; UNLOCK—remove a lock from a resource. Some notable headers (field names) are: destination—specifies a URI as a destination resource for methods such as COPY and MOVE; Lock-Token—specifies a token that identifies a particular lock; and Timeout—specifies a duration of a lock.

It has not previously been recognized that there are certain inefficiencies and weaknesses built into WebDAV that can become significant in certain circumstances. FIG. 4 shows a timeline for a sequence of related authoring requests. Suppose that a user of HTTP client 52 would like to get and lock a resource on HTTP server 54. The user will first direct the client 52 to get a particular resource. The client 52 will generate and transmit a GET request 120 to the server 54. The server 54 handles the GET request 120 and returns an appropriate response 122. The round trip time is the time between client 52's transmission of the GET request 120 and the receipt of response 122. As can be seen in FIG. 4, much of the round trip time can be attributed to the time that it takes for the GET request 120 and the response 122 to traverse the network. If the user also needs to lock the resource obtained by GET request 120, another round of communication is needed: client 52 sends discrete LOCK request 124; LOCK request 124 passes through the network; and the server 54 replies with a response 126 that also crosses the network. The second exchange has its own round trip time that may include significant network transmission time. The total time 128 to meet two related needs of the client 52 (the need to both get and lock a resource) includes the time for two round trips or four network transmissions. Furthermore, the two discrete requests 120, 124 require approximately twice the server overhead as a single request, which might cause further delay if the server is heavily loaded.

Another problem with the example in FIG. 4 is that the requested resource could be modified or locked by another client (or the server 54 itself) between the time that client 52 requests the resource and the time the client 52 is able to obtain a lock on the resource. In other words, another request can affect the resource after it is received by the client 52 but before the client 52 is able to obtain a lock on the resource, which could cause an error or unexpected result.

The atomic nature of WebDAV and the inability of WebDAV clients and servers to use compound or multi-aspect authoring requests with one discrete exchange may have other problems and inconveniences. Without necessity, some embodiments discussed below may alleviate some problems associated with HTTP authoring.

SUMMARY

The following summary is included only to introduce some concepts discussed in the Detailed Description below. This summary is not comprehensive and is not intended to delineate the scope of protectable subject matter, which is set forth by the claims presented at the end.

Certain client-server communication conventions extend compounded web authoring methods to a web authoring protocol such as WebDAV. More particularly, a web authoring request can be provided with special header information to signify a first web authoring method compounded with a second web authoring method indicated by a verb in the request. Clients and servers are provided with techniques to use the web authoring extensions. Extended error handling can be used to allow servers to provider richer web authoring error information to clients.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 8 shows how requests can be formatted to invoke compounded locking.

FIG. 9 shows a mechanism for compounding property methods with HTTP or WebDAV methods or verbs.

FIG. 10 shows further compounded methods.

FIG. 11 shows an example POST+PROPFIND+LOCK method request and a corresponding response.

FIG. 12 shows an error handling table and examples of a response using extended error handling.

DETAILED DESCRIPTION

Figure 5:
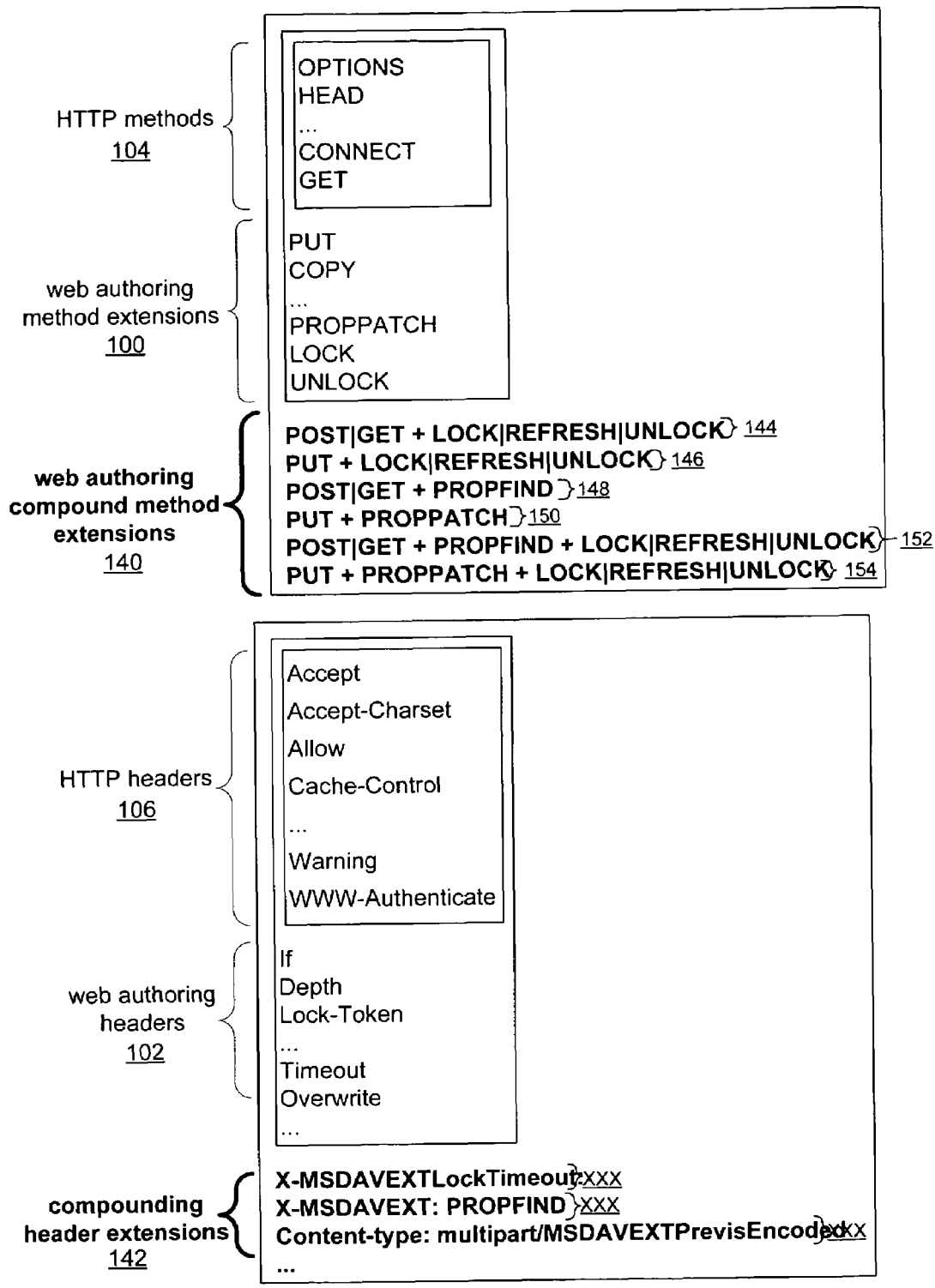
FIG. 5 shows some web authoring method extensions and compounding header extensions that can be used to allow clients and servers to compound two or more authoring related methods with single client-server exchanges.

FIG. 5 shows some web authoring method extensions 140 and compounding header extensions 142 that can be used to allow clients and servers to compound two or more authoring related methods with single client-server exchanges. Although the method extensions 140 are characterized as "methods", they need not involve verbs or request lines 54 that are different than those defined by HTTP and WebDAV. However, conceptually, the method extensions 140 discussed below effectuate compound authoring methods. As discussed below, these in-effect compound authoring method extensions 140 can be accomplished using various compounded header extensions 142.

In the Figures, the symbols "+" and "|" (vertical bar) respectively represent compounding and "or". So, for example, the "POST|GET+LOCK|REFRESH|UNLOCK" method 144 represents a number of discrete compound methods: "POST+LOCK", "POST+UNLOCK", "GET+LOCK", etc. An explanation of how the method extensions 140 can be implemented using header extensions 142 will follow. Methods 144 and 146 will be discussed with reference to FIG. 8. Methods 148 and 150 will be discussed with reference to FIG. 9. Methods 152 and 154 will be discussed with reference to FIGS. 10 and 11.

Figure 1:
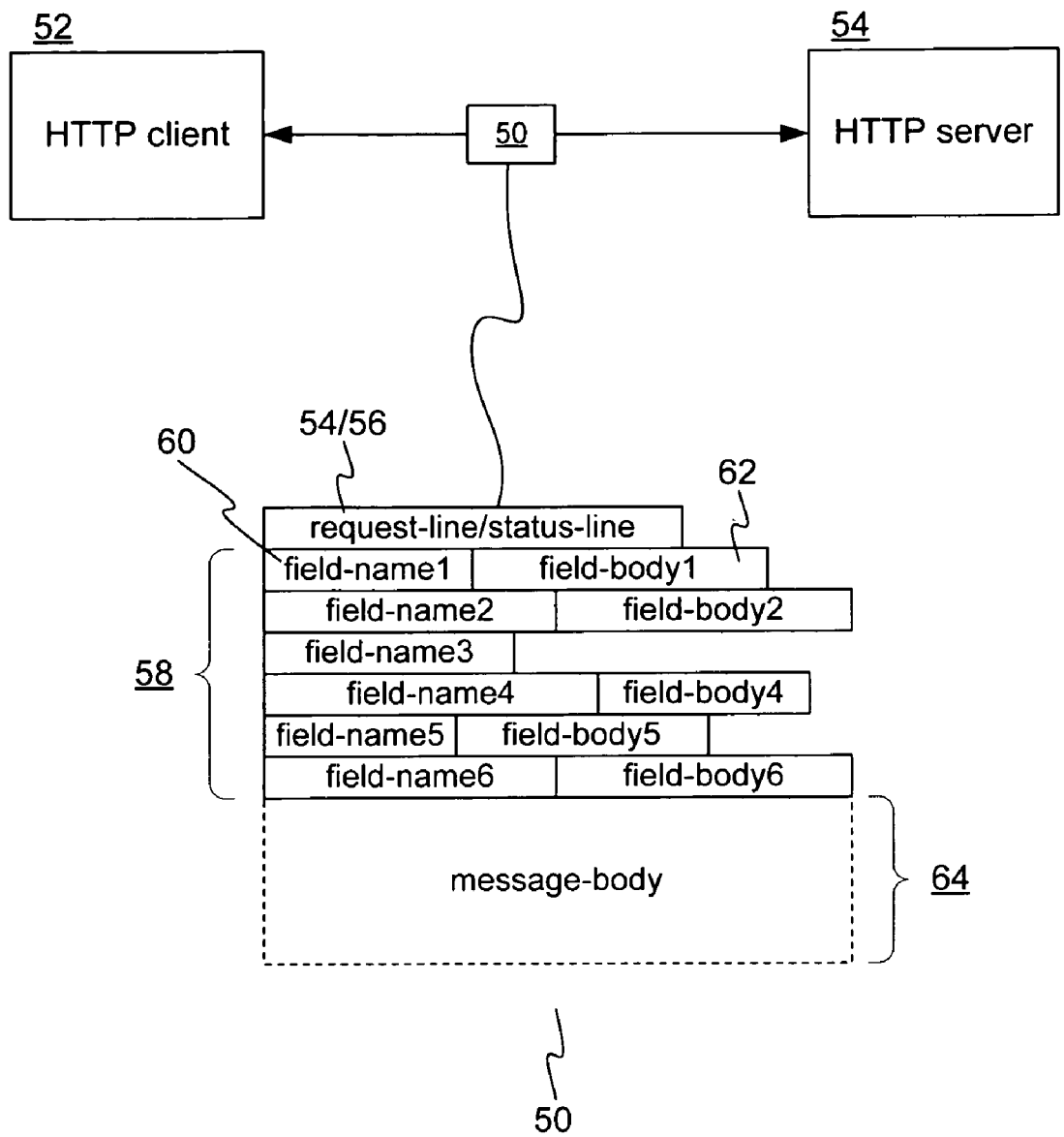
FIG. 1 shows an HTTP message.
Figure 2:
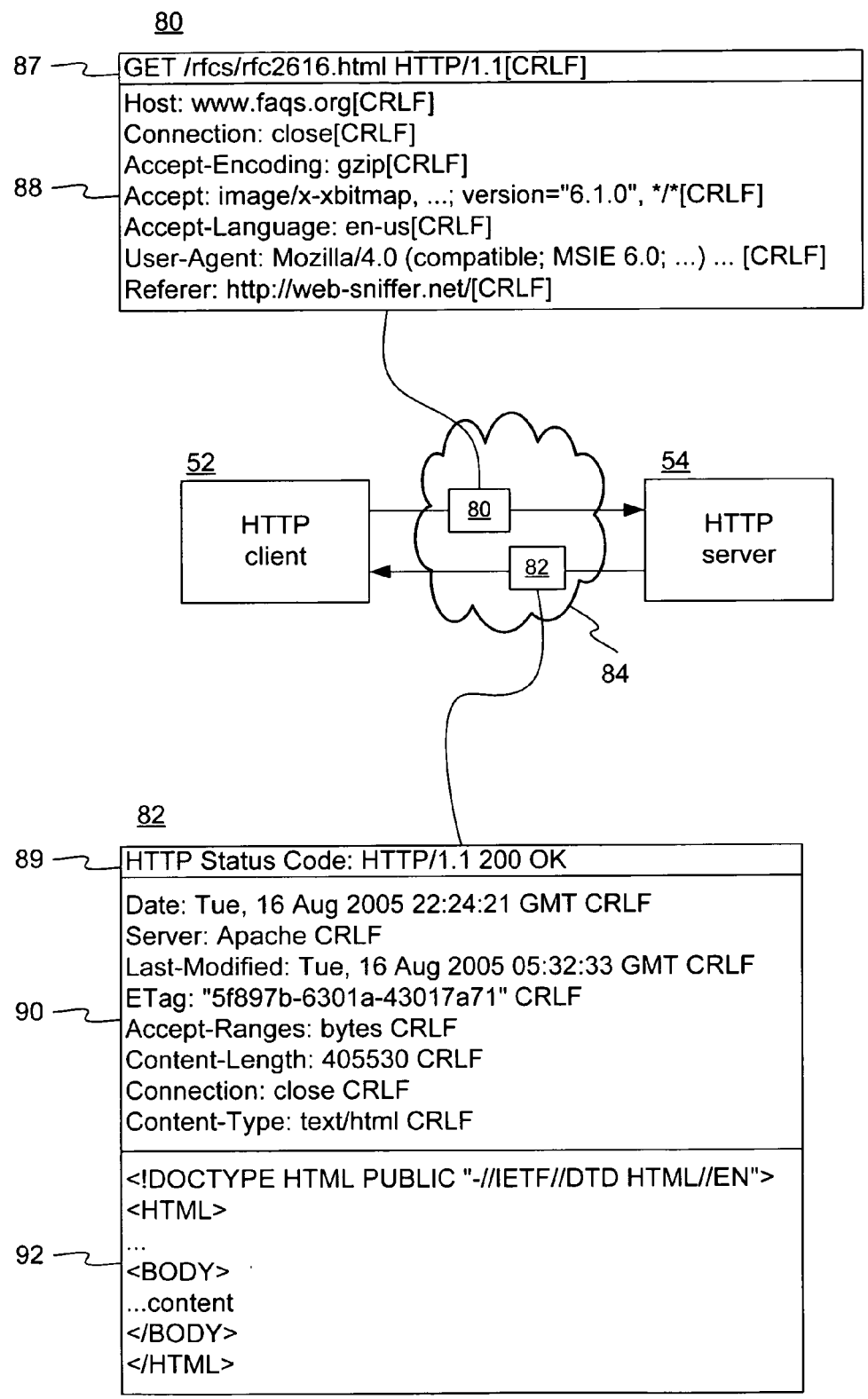
FIG. 2 shows an example HTTP request and an example HTTP response.
Figure 3:
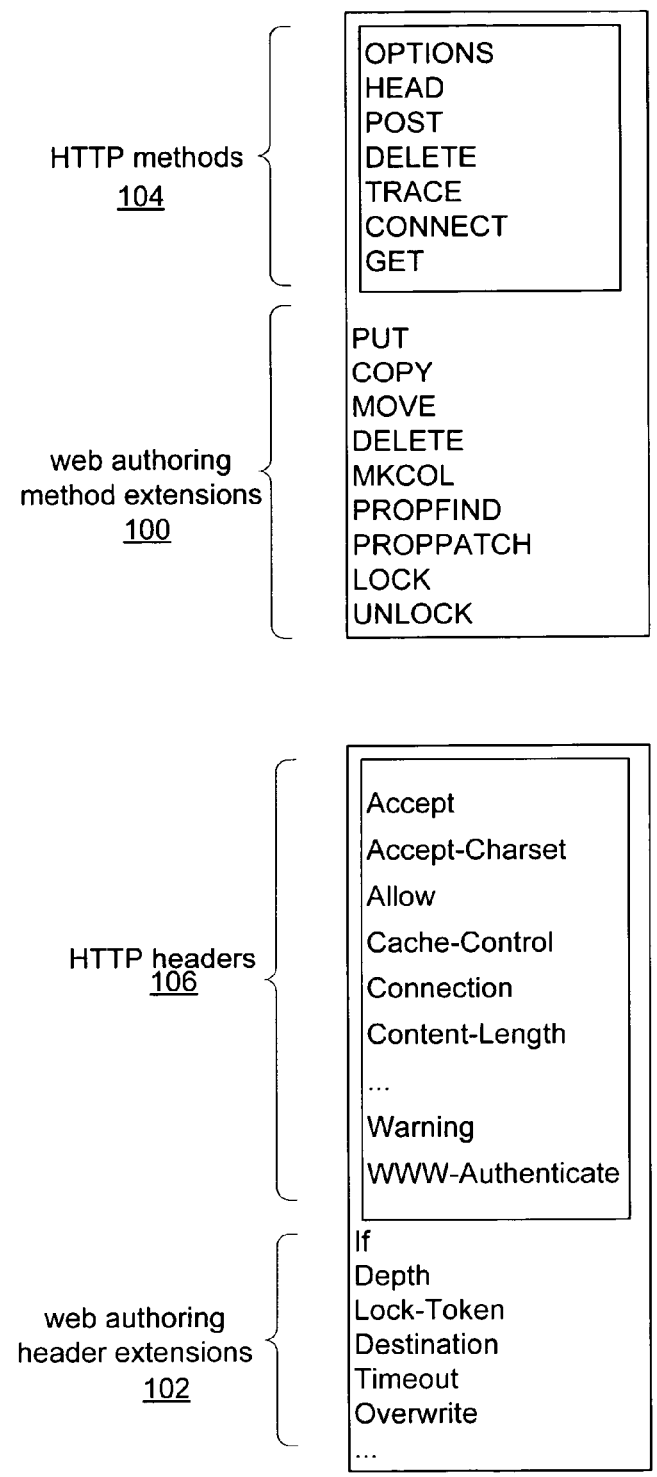
FIG. 3 shows some method extensions and header extensions of a protocol or extension of HTTP that adds remote authoring functionality on top of HTTP.
Figure 4:
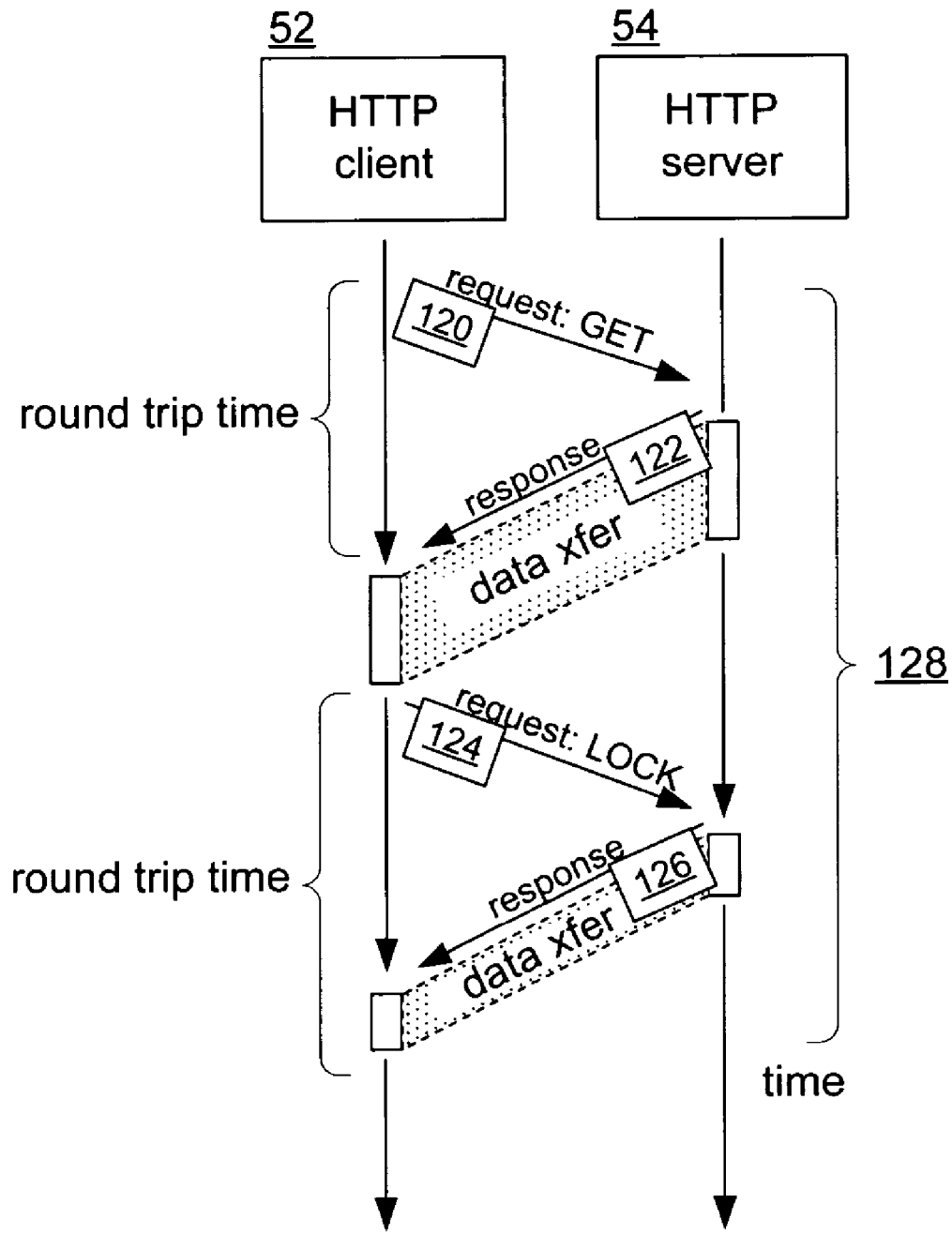
FIG. 4 shows a timeline for a sequence of related authoring requests.
Figure 6:
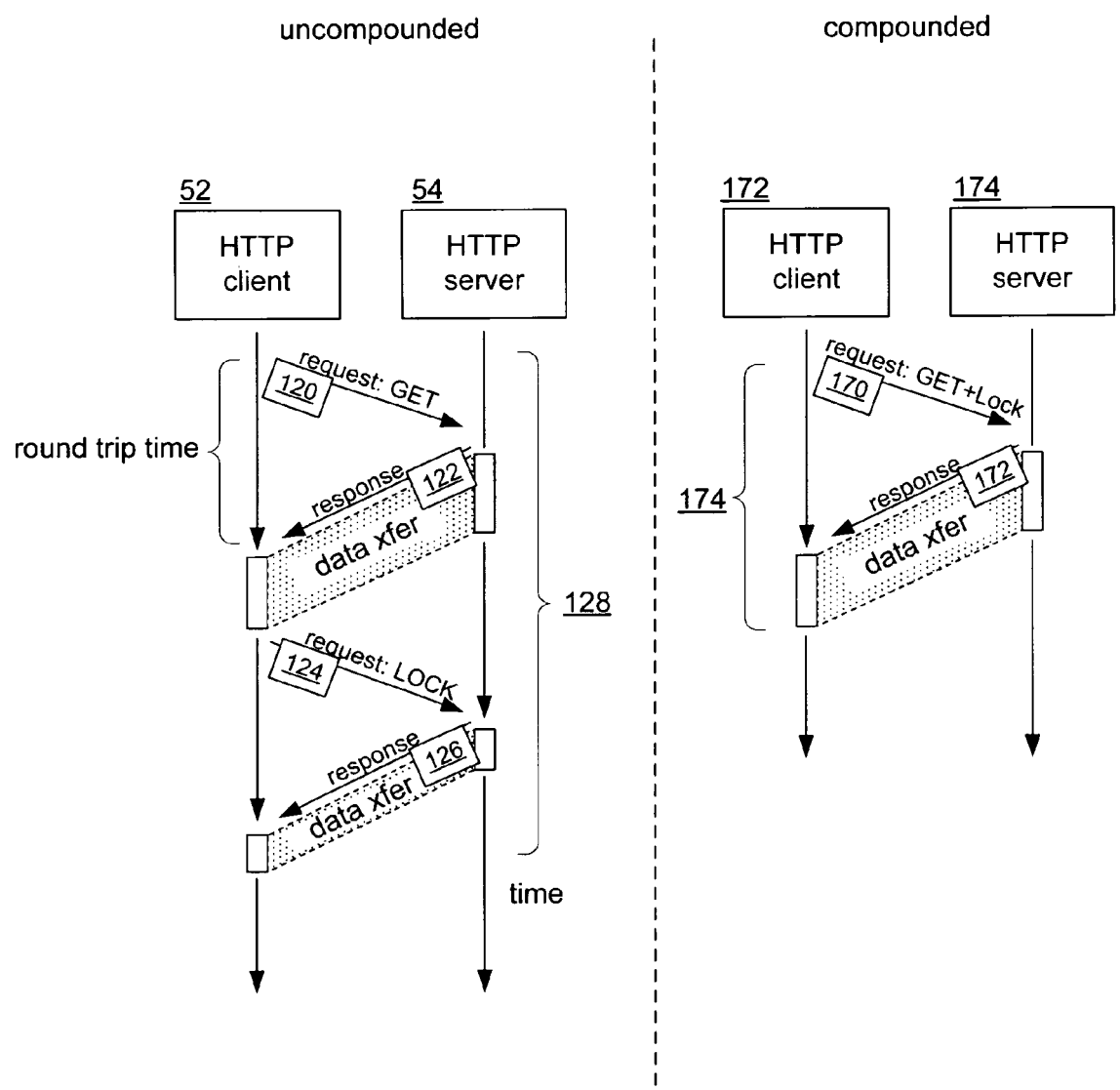
FIG. 6 shows an uncompounded authoring exchange and a compounded authoring exchange with a similar purpose.

FIG. 6 shows an uncompounded authoring exchange and a compounded authoring exchange with a similar purpose. The left hand side of FIG. 6—a repetition of FIG. 4—shows the flow of an uncompounded authoring exchange. The right hand side of FIG. 6 shows the flow of a compounded authoring exchange. On the right hand side of FIG. 6 (the compounded example), a single request message 170 is sent by the client 52. The request message 170 includes information indicating a GET operation directed to a resource on server 174 and information indicating that the server 174 is to also lock the resource for the client 172. In the compounded case, there is one exchange with the time of one round trip. The total transaction time 174 for the compounded request 170 is less than the total transaction time 128 of the uncompounded requests 120, 124. Furthermore, because the server 174 can tell from the request message 170 that a lock is desired, the server 174 can immediately lock the requested resource, thus preventing an intervening request from interfering with client 172's request.

Figure 7:
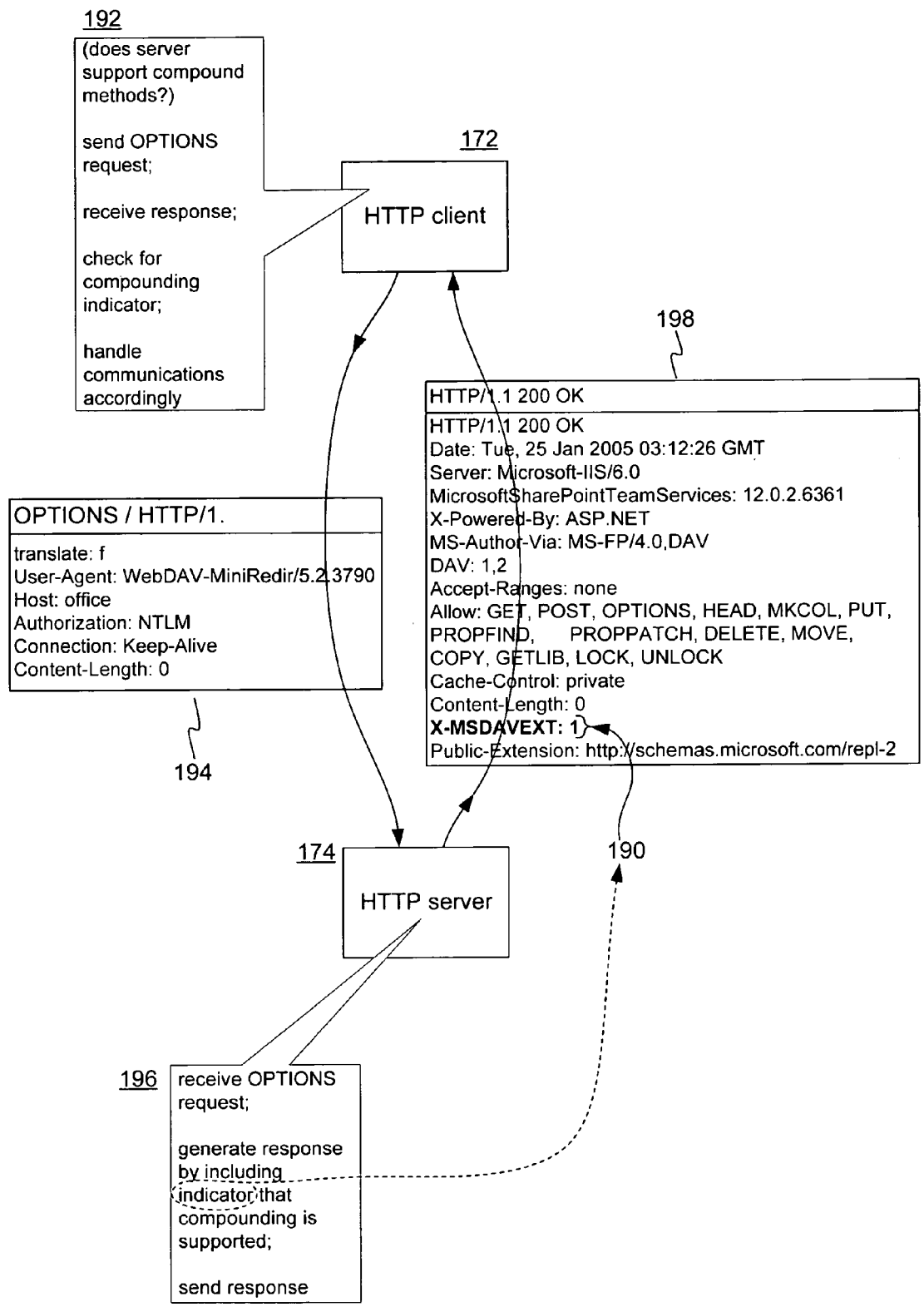
FIG. 7 shows how a client can determine if compounding is available on a server.

FIG. 7 shows how client 172 can determine if compounding is available on server 174. As mentioned earlier, it is desirable (but not necessary) for a client to be able to use both compounded and uncompounded authoring requests. It is also desirable for a server to be able to support both compounded and uncompounded authoring requests. A mechanism can be provided for this purpose. Preferably, the mechanism involves including information in a server response that indicates whether compounding is supported by the server. Although this information can take any form, the use of a new response header 190 is convenient because clients usually ignore unrecognized headers in an HTTP response. Furthermore, known algorithms for header parsing can be readily extended to process a new header or field name. In the alternative, a compounding indicator can take the form of a new value for a standard header, a special status line, etc.

To establish the availability of compounding, the client 172 performs a process 192 that starts with sending a standard OPTIONS request 194 (request 194 is only an example). A process 196 on the server 174 receives the OPTIONS request 194 and generates a response such as response 198 that includes a compounding indicator, in this embodiment, non-standard response header 190. The actual name of the non-standard response header 190 is not important other than it be known in advance by the client 172 so that when the client's 172 process 192 receives the response 198 it can recognize it and communicate with the server 174 as appropriate.

FIG. 8 shows how requests can be formatted to invoke compounded locking. The top part corresponds to the extended methods 144 (see FIG. 5) for GET or POST locking, and the lower part corresponds to the extended methods 146 for PUT locking. In one embodiment, ordinary HTTP and WebDAV request verbs 220 GET, POST, and PUT are compounded with locking requests using various combinations of a standard Lock-Token header 222 and a non-standard or extended lock timeout header 224, for example "X-MSDAV-EXTLock-Timeout". The lock timeout header 224 has a value of 0 or more seconds.

The lock timeout header 224 signifies the creation of a new lock according to the value of the lock timeout header 224. If the Lock-Token header 222 is included then the lock timeout header 224 signals the refresh of an existing lock. If the lock timeout header 224 is set to 0 seconds than an unlock is indicated (in this case, the Lock-Token header 222 and a correct token are required to unlock the file). Furthermore, a Lock-Token header 222 and token are preferably included in the response to any write operation on a locked resource. Example request 228 shows what a typical POST+UNLOCK request might look like. Note the inclusion of a Lock-Token header 222 and a lock timeout header 224.

Referring to the PUT verb combined with a locking operation, note that the Lock-token header 222 and correct token are needed to modify a locked resource. No token is needed if the resource is not locked. If no token is included but a lock time is specified, then the natural locking logic occurs; a lock is granted if no lock exists, and the PUT and lock are denied if a lock already exists. In sum, if the correct token is included with a PUT request the client can perform any PUT operation or any PUT operation combined with a lock operation. A typical PUT+REFRESH request is shown by request 230. The lock timeout value of 120 seconds indicates a refresh or resetting of the lifetime of the lock to run for another 120 seconds, and the lock token is the key that the server uses to authorize both the PUT operation and the REFRESH operation. In a preferred embodiment a Lock-Token header included in a non-write operation is ignored; i.e., "GET+ verify an existing lock" is not supported.

FIG. 9 shows a mechanism for compounding property methods with HTTP or WebDAV methods or verbs. These compound methods correspond to the methods 148, 150 in FIG. 5. The compounded property methods use two indicators; a special content type header value 240 (e.g., "multipart/MSDAVEXTPrefixEncoded") and a special extensions header 242 with various possible values such as "PROPFIND" and "PROPPATCH". The combinations in table 244 are self-explanatory and the resulting methods allow a resource to be accessed or modified while at the same time obtaining or setting one or more properties of the relevant resource. Furthermore, the standard Content-length header will be used and will give the value of the total message body or payload, which may also include properties as well resources (discussed further below).

In conformance with the rules of table 244, an example GET+PROPFIND request 246 is shown. Note the inclusion of an indication of the PROPFIND portion of the method in the form of the special extensions header 242 with the appropriate value or verb.

Although in one embodiment property related methods are compounded onto other methods using headers and a message body extension, other approaches may also be used. For example, the WebDAV PROPFIND and PROPPATCH methods could be overloaded using new headers. Furthermore, there are different ways for combining a resource and a set of properties in a message body. All of the properties can be put in separate headers, since most property sets are of manageable size. The properties could be assigned to respective different headers, although this would require more coding to handle transport of properties. In another embodiment, all of the properties (XML structure) can be placed in one large header, however, headers could potentially become larger than the buffers that some web servers allocate for header handling.

It is possible that some implementations may need to simultaneously set properties (PROPATCH) and get properties (PROPFIND) of a resource. For example, to determine whether a particular property was properly set, or to determine what a property was set to before it was changed with a PROPPATCH. In this case, "PROPPATCH" and "PROPFIND" can both be included, and a convention can be established for the location of sent and returned properties in the message body.

Although the WebDAV protocol does not specify particular properties for resources, some typical properties are analogous to properties of objects in a file system, for example content size, creation date, date of last modification, last modifying user, special folder type, resource tag, file attributes, creation time, last access time, last modified time, and so on.

FIG. 9 also shows an example GET+PROPFIND response 250. Note that the content type header field 240 signals the presence of a multi-part message body using the special "multipart/MSDAVEXTPrefixEncodedheader" extension. The lock related information is not required for the PUT+ PROPPATCH method but may signify the presence of a server-side lock. The content type header field 240 signifies the presence of the multi-part message body 248 within a message body 64. Generally those multiple parts are divided by a length field followed by a corresponding data, in other words, the message body 64 carries one or more pieces of discrete data, each preceded by a corresponding length indicator. The sizes of the length fields and the sizes of their data add up to the standard Content-length header. The example response 250 in FIG. 9 happens to have a properties section and a resource section, each preceded by a respective length field, for example, a 64 bit integer. Because compound authoring is designed as an HTTP extension, the standard HTTP message body 64 is used. Because properties may need to be exchanged in a message that may also include a resource such as an HTML document, the length-data pairings allow both properties and resources to be carried in a same message body 64. The standard Content-length header gives the total length of the message body 64/248 and can be used, in conjunction with the length indicators, to parse out the substantive pieces of content in the message body 248.

Referring back to the methods 152, 154 in FIG. 5 (POST|GET+PROPFIND+LOCK|REFRESH|UNLOCK, PUT+PROPPATCH+LOCK|REFRESH|UNLOCK), these methods can be implemented by combining the properties and locking extensions discussed above. Because locking functionality and properties functionality is logically separate, the methods and headers discussed above can readily coexist in a message. FIG. 10 shows further compounded methods. The top message is an example of a PUT+PROPPATCH+UNLOCK request 270. Note the size of the body, including the size of the length fields, is 114234. The bottom message is an example of a corresponding response 272. A response that is successful need not differ from the response to a normal PUT request. The lack of a lock token header denotes a successful unlock. FIG. 11 shows an example POST+PROPFIND+LOCK method request 290 and a corresponding response 292. The request 290 causes the server to put a resource or file, set some properties, and unlock the file or resource.

FIG. 12 shows an error handling table and examples of a response 302 using extended error handling. A number of types of errors can occur when creating a resource on a server via an extended HTTP authoring request, for example, insufficient permissions, a resource checked out by another user or not checked at all, a quota violation, or a blocked filename or file type, the presence of a virus, etc. Other errors such as a missing property can occur when attempting to write to a file or resource. When an authoring error occurs on a server, typically the server may have rich system-level information about the error. Previously, when a module or server that implements WebDAV methods would encounters an error it would translate that error to a standard HTTP error code. A client might attempt to provide a useful message about the error code, perhaps using a corresponding hardcoded message string. However, the standard HTTP error codes are not rich enough to support the number and types of errors which users can encounter using extended HTTP authoring. Therefore, an extension is optionally provided to extend the error information fed back to a client, while keeping the existing HTTP error code, which allows for backward compatibility. This extended error handling is accomplished by including in responses information specific to system-level errors on the server.

As seen in FIG. 12, extended error handling can be realized using a new HTTP header, for instance "X-MSDAVEXT_ERROR: Decimal; String". The decimal portion is a code that maps to a system-level error such as a Unix file control error or a Win32 error. Preferably, the String portion is in UTF-8 format.

Regarding compounding extensions of web authoring protocols in general, it should be noted that some proxy servers may attempt to interpret requests and send back cached responses. Therefore, it is preferable that clients only use the new extensions or methods with POST rather than GET. Furthermore, when responding to a concatenated method or verb as discussed above, a server should mark a response to indicate that it should not be cached, using, for example, a header like "cache-control: private".

The server and client processes for using extended compound authoring methods are fairly straight forward given conventions as discussed above. Publicly available source code and documentation can be consulted to determine how to implement servers and clients with the functionality for performing atomic authoring methods and in particular locking and property functionality. This functionality can be performed in serial fashion when a compound method is encountered. For example, whereas previously a server may have had a function to handle a LOCK method and a function to handle a POST method, roughly, those functions can be invoked consecutively when a compounded POST+LOCK method is received.

Although HTTP and WebDAV have been discussed above, the ideas discussed above are expected to be applicable to any future variations or versions of HTTP and WebDAV. Furthermore, a standard protocol is considered to refer to any future or current standard protocol.

Further to aspects of extended error passing, there may be provided a volatile or non-volatile machine-readable media storing information to enable a device to perform a process for servicing requests from clients, the process including: handling standard HTTP get requests, standard HTTP post requests, and standard HTTP options requests and sending responses to corresponding clients; handling HTTP standard or non-standard authoring requests that direct the device to lock/unlock resources or direct the device to obtain or set properties of resources; and when errors occur handling the HTTP authoring requests, returning responses comprising error information that is not a HTTP status code. The error information can correspond to a system error of the device that caused the errors to occur. The error information can include an extended error header name and an accompanying header field comprising identifying and/or describing a corresponding error, and furthermore, in such a case the header field may include a system error code of the device, or the header field can include a string specifically describing the error, or the header field can include a system error code of the device (the error code being or identifying a system error of the device), or the system error comprises a file locking error, or a file or directory read error, or a file or directory write error.

Further to another aspect of extended error passing, a volatile or non-volatile medium for storing digital data may be provided, the medium storing an HTTP response, the HTTP response including: a standard HTTP status code header and corresponding error code; and an indication of a server-side error, where the indication is not defined by a standard HTTP. The indication can include an HTTP header field specifically defined for conveying extended error information other than standard HTTP error codes, in which case the header field may include a field name not defined by a standard HTTP protocol and a field body that carries information about the server-side error, in which case it is further possible that the field body identifies a particular type of server-side error and that error does not correspond to a standard HTTP error code. The field body can include an operating system error code or a string describing an operating system error, and furthermore, the server-side error can comprise an operating system locking error, or an error reading or writing a server file or server directory.

In still another extended error handling embodiment, there may be provided a volatile or non-volatile storage for use with a processing device and storing information for enabling the processing device to perform a process, the process comprising: generating an HTTP request and sending the HTTP request to a server; receiving from the server an HTTP response to the HTTP request; and parsing the HTTP response for a non-standard extended error header and extracting from the non-standard extended error header information about an error on the server. The HTTP request can further include a standard HTTP status code header and corresponding error number. The information about the error on the system can comprise detail about a specific type of filesystem or operating system error on the server. The information about the error on the server can comprise an operating system error number. The information about the error on the server can include a string describing an operating system error. The information about the error on the server may either identify or describe a specific system-level error of the server, further to which the HTTP requests may comprise an HTTP-based authoring request, either compounded or non-compounded, and the error on the server was an error performing a locking-related or properties-related method.

In conclusion, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

The invention claimed is:

1. A volatile or non-volatile computer-readable media storing information to enable a server computing device to perform a process for servicing requests, the process comprising:
   handling, at the server computing device, standard HTTP get requests, standard HTTP post requests, and standard HTTP options requests;
   handling, at the server computing device, requests that conform to an HTTP authoring protocol, the requests comprising put requests, copy requests, move requests, propfind requests, and proppatch requests;
   sending an indicator to a client computing device indicating that the server computing device handles compounded authoring requests;
   receiving, at the server computing device, the compounded authoring requests, each of the compounded authoring requests including a special content type header value that identifies a request as one of the compounded authoring requests and a special extensions header including a compounded verb of the HTTP authoring protocol;
   handling, at the server computing device, the compounded authoring requests that do not conform to the HTTP authoring protocol, the compounded authoring requests comprising put+proppatch requests and post+propfind requests; and
   performing put functionality and proppatch functionality responsive to a put+proppatch request, or performing post functionality and propfind functionality responsive to a post+propfind request.

2. A media according to claim 1, the process further comprising performing get functionality and propfind functionality responsive to a get+propfind request.

3. A media according to claim 1, where the handled requests that do not conform to the HTTP authoring protocol further comprises requests that, in single requests, specify both a post, get, or put operation, and a lock, unlock, or lock refresh operation.

4. A media according to claim 1, wherein the process further comprises responding to an HTTP OPTIONS request by generating a response that includes header information indicating support for single requests with compounded authoring requests.

5. A media according to claim 1, wherein the compounded authoring requests comprise a method field conforming to the HTTP authoring protocol and a header name or header field not defined by the HTTP authoring protocol.

6. A media according to claim 1, the process further comprising including a set of properties and a resource in a body of a response message.

7. A computing system for storing information to enable a device to perform a process for servicing requests, the system comprising:
   a processor; and
   a computer-readable medium storing instructions that, when executed by the processor, cause the processor to:
   handle, at a server computing device, standard HTTP get requests, standard HTTP post requests, and standard HTTP options requests;
   handle, at the server computing device, requests that conform to an HTTP authoring protocol, the requests comprising put requests, copy requests, move requests, propfind requests, and proppatch requests;
   send an indicator to a client computing device indicating that the server computing device handles compounded authoring requests;
   receive, at the server computing device, the compounded authoring requests, each of the compounded authoring requests including a special content type header value that identifies a request as one of the compounded authoring requests and a special extensions header including a compounded verb of the HTTP authoring protocol;
   handle, at the server computing device, the compounded authoring requests that do not conform to the HTTP authoring protocol, the compounded authoring requests comprising put+proppatch requests and post+propfind requests; and
   perform put functionality and proppatch functionality responsive to a put+proppatch request, or performing post functionality and propfind functionality responsive to a post+profind request.

8. The computing system of claim 7, where the handled requests that do not conform to the HTTP authoring protocol further comprises requests that, in single requests, specify both a post, get, or put operation, and a lock, unlock, or lock refresh operation.

9. A method for servicing requests, the method comprising:
   handling, at a server computing device, standard HTTP get requests, standard HTTP post requests, and standard HTTP options requests;
   handling, at the server computing device, requests that conform to an HTTP authoring protocol, the requests comprising put requests, copy requests, move requests, propfind requests, and proppatch requests;
   sending an indicator to a client computing device indicating that the server computing device handles compounded authoring requests;
   receiving, at the server computing device, the compounded authoring requests, each of the compounded authoring requests including a special content type header value that identifies a request as one of the compounded authoring requests and a special extensions header including a compounded verb of the HTTP authoring protocol;
   handling, at the server computing device, the compounded authoring requests that do not conform to the HTTP authoring protocol, the compounded authoring requests comprising put+proppatch requests and post+propfind requests; and
   performing put functionality and proppatch functionality responsive to a put+proppatch request, or performing post functionality and propfind functionality responsive to a post+propfind request.

10. The method of claim 9, where the handled requests that do not conform to the HTTP authoring protocol further comprises requests that, in single requests, specify both a post, get, or put operation, and a lock, unlock, or lock refresh operation.

* * * * *